United States Patent Office 3,494,874
Patented Feb. 10, 1970

3,494,874
SILICEOUS ADSORBENT MATERIALS AND
PROCESS FOR PREPARING SAME
Edith M. Flanigen, Buffalo, and Robert W. Grose,
Niagara Falls, N.Y., assignors to Union Carbide
Corporation, a corporation of New York
No Drawing. Continuation-in-part of application Ser. No.
504,101, Oct. 23, 1965. This application Dec. 8, 1967,
Ser. No. 688,955
Int. Cl. B01j 11/40; C01b 33/16
U.S. Cl. 252—450    9 Claims

ABSTRACT OF THE DISCLOSURE

Invention relates to a novel high surface silica gel adsorbent prepared by the controlled extraction of a narrow class of metal silicates with aqueous acids having $pK_a$ values of less than about 3. Critical factors in the process are (a) the normality of the acid solution, (b) the acid-to-metal ion equivalence, (c) the extraction time, (d) the pH of the silicic acid solution prior to gelling, and (e) the dehydrating temperature of the gel. The gel products are characterized by an equivalent nitrogen surface area of at least 700 sq. meters/gram and a unique distribution of micropore and capillary pore volumes.

---

This is a continuation-in-part of application Ser. No. 504,101 filed Oct. 23, 1965, now abandoned.

The present invention relates in general to siliceous adsorbent materials and more particularly to novel mineral-derived silica gel adsorbents and to the process for their preparation.

A very large number of silica gels have been prepared by an equally large number of different techniques. The properties of these materials vary over a wide range and only a relative few can be considered practical adsorbent materials. One conventional method for forming adsorbent quality silica gels is the acidification and gelation of water solutions of soluble silicates such as sodium silicate. Although an apparently simple technique, it has been found that the siliceous starting material, the type of acid, the concentration of acid, the temperature of acid treatment, and the method of dehydrating the gel all are important factors influencing the nature of the silica gel formed.

Accordingly, silica gels are commercially available which have ultimate particle sizes of from over 1000 microns to below 10 microns and specific surface areas of from 20 to about 850 square meters per gram. These silica gels are utilized in such diverse applications as filter aids, fillers for plastics and rubbers, anticaking agents, thickeners for lubricating greases, antiblocking agents for plastic sheeting, and chemical adsorbents.

It is the general object of the present invention to provide novel silica gel adsorbents of very high specific surface area and a process for preparing same from certain silicate minerals.

In accordance with the process of the present invention a metal silicate mineral (either naturally occurring or synthetic) of the class having the general empirical formula (I) $\quad M_{2/n}O \cdot c[SiO_2] \cdot xH_2O$ wherein M is selected from the class consisting of Ca, Li, Mg, (Mg, Fe), (Ca, Na, H) and (Ca, B, H), $n$ represents the equivalents of M, $x$ is an integer having a value of from 0 to 1 inclusive, and $c$ has a value of 0.5 to 1 when M is a member selected from Ca and Li; $c$ has a value of 0.5 when M is a member selected from Mg and (Mg, Fe); $c$ has a value of 1 when M is (Ca, Na, H); and $c$ has a value of 0.3 when M is (Ca, B, H); is contacted with an aqueous solution of a strong organic or inorganic acid having a concentration of from about 0.5 N to about 4 N at a temperature in the range of 20° C. to about 105° C., the acid equivalent to metal ion equivalent being within the range of from about 0.9 to 2.75, for a period of time to form an aqueous silicic acid solution containing from about 1 to about 3 wt.-percent $SiO_2$, separating the silicic acid solution from any remaining insoluble material, gelling the silicic acid solution at a pH within the range of from about 0.5 to about 4, and dehydrating the gel thus formed at a temperature of from about 20° C. to about 100° C. The resulting activated silica gel produced by the aforesaid process is an agglomerate adsorbent material (not powder) of substantial hardness and strength and having a specific surface area of about 700 to 900 square meters per gram.

The metal silicates suitably employed in this invention and represented by the above general Formula I include the metasilicates wollastonite ($CaSiO_3$) and blast furnace slag, which is principally $CaSiO_3$, and $Li_2SiO_3$; and the ortho-silicates larnite ($Ca_2SiO_4$), $Li_4SiO_4$, chrysolite [$(Mg, Fe)_2SiO_4$], datolite ($HCaBSiO_5$), pectolite

[$HNaCa_2(SiO_3)_3$]

and forsterite ($Mg_2SiO_4$). These silicates are available in naturally occurring deposits or can be prepared synthetically. Metal silicates in the above class may be amorphous or cryptalline and may also contain small quantities of iron, titanium, etc. as impurities. The metasilicate $CaSiO_3$, either as wollastonite or blast furnace slag, has been found particularly suitable for use in the present process and is preferred.

The acids which in aqueous solution can be successfully employed to dissolve silica from the aforesoid metal silicates include both organic and inorganic acids, provided only that said acids have a $pK_a$ value of 3 or less. The term $pK_a$ is used herein in its conventional sense as representing the negative logarithm of the acidic concentration ionization constant. Variations of the ionization constant within the acid concentration range employed in the present process are not sufficiently significant to warrant the use of the thermodynamic ionization constant $K_a^t$. For polyvalent acids the $pK_a$ value for purposes of this invention is considered to apply only to the primary ionization.

Illustrative of suitable organic acids are trifluoroacetic acid, dichloroacetic acid, nitroacetic acid, bromoacetic acid, but-2-yn-1-oic (tetrolic) acid, propiolic acid, malonic acid, maleic acid, fumaric acid, -bromopropionic acid, oxalic acid, phthalic acid, picric acid, and salicylic. Suitable inorganic acids include hydrochloric acid, hydroiodic acid, sulfuric acid, phosphoric acid, nitric acid, pyrophosphoric acid, hydrophosphorous acid, sulfurous acid, arsenic acid, and selenic acid. Since the present invention has a principal object the provision of an inexpensive but effective silica gel adsorbent, it is economically as well as technologically advantageous to employ as the leaching acid a strong mineral acid such as hydrochloric sulfuric or nitric acid.

In the reaction between the acid and the metal silicate the solution of silica from the framework of the silicate is of primary importance to the present process. This reaction, however, is necessarily accompanied by the leaching of the metal ion, i.e., calcium, lithium or magnesium as well as any other metal cation impurities which may be present, from the crystal structure. With respect to this metal ion leaching reaction the concentration of the acid with respect to its aqueous solution is not at all critical and can be efficiently carried out over a wide range of acid normalties and pH conditions. The solution of silica from the crystal framework can only be effected, on the other hand, over a narrow critical range of aqueous acid solution concentrations to obtain the novel gels of this invention. This latter range is from about 0.5 to about 4 normal, and preferably within the range of from about 0.75 to about 2 normal, with an optimum of about 1 normal.

With respect to the metal silicate being treated with the acid solution, the quantity of acid employed should be such that the ratio of the equivalents of hydrogen ion derivable from the acid to the equivalents of metal ion of the silicate is from at least 0.9 to about 2.75. Ratios below 0.9 cause undue viscosity of the reaction slurry and inefficient mixing and reaction. Ratios above about 2.75 lead to degradation of the resulting silica gel and a substantial decrease of effective surface area of the final adsorbent product. Of the range of 0.9 to 2.75, however, the lower part is preferred because of the general lowering of gelation times with decreasing acid concentrations. The optimum acid to metal ion equivalents ratio has been found to be about 1.1.

For carrying out the acid leaching of metal cations and solution of silica from the crystalline silicate structure, temperatures of from ambient room temperature to about 105° C., i.e., approximately the boiling point of the aqueous acid solution, are suitably employed. Below ambient room temperature, i.e. below about 20° C., reaction rates are relatively slow and practicality of the operation is reduced. Temperatures above about 105° C. tend to reduce the surface area and alter other properties of the final silica gel product. Reaction times are interdependent with reaction temperatures and should be sufficiently long to decompose the silicate and give maximum silica solubility without giving rise to simultaneous gelation in the presence of residual pseudomorphic silica. Optimum times and temperatures further vary somewhat depending on the particular metal silicate and acid employed. For wollastonite treated at 100° C. with 1 normal HCl using an acid-metal cation equivalent ratio of 1.1, reaction periods as low as about 15 minutes were found suitable. Under the same conditions and using the same materials, reaction periods as long as 6 hours have also been utilized. Beyond this period undesirable gelation occurred. For efficient homogeneous leaching, vigorous agitation of the reaction mixture is desirable but not essential. Ultrasonic vibration has been found to be a very effective means of agitation.

Having carried out the leaching operation and having obtained a silicic acid solution, the system is separated, advantageously by vacuum filtration, into the aqueous solution phase and the solid phase of whatever solids may remain. With wollastonite and most of the other metal silicates suitably employed, this solid phase consists primarily of mineral impurities not reactive with the acid and a porous silica structure which is amorphous to X-rays but which is pseudomorphic after the untreated metal silicate. The surface area of this pseudomorph is usually the order of 500 to 550 square meters per gram.

Although gels from the silicic acid solution can be produced at any pH, the surface area of the final activated silica gel is strongly dependent upon the pH of the solution during the formation of the gel. The high surface area desired from the practice of the present invention, i.e. about 700–900 square meters per gram, have been found to result from gelation of the silicic acid solution at a pH value within the range of from about 0.5 and about 4, with optimum results attained using pH values between about 1.0 and 2.5. When pH values less than about 0.5 and greater than about 4 are employed, there results a serious reduction in the specific surface area of the product gel.

Accordingly after isolation of the silicic acid solution from the solid residue of the reaction system has been accomplished, the pH of the solution is adjusted, if necessary, to a pH value within the aforesaid suitable range. Advantageously the solution is permitted to age, i.e., remain quiescent, during the gelation period while being maintained at a temperature between about 25° C. and 100° C. At 100° C. reaction and in the absence of gel catalysts aging-gelation times of the order of about 15 to 25 hours are usually required for complete gelation of the solution to take place. At 25° C. under otherwise identical conditions, complete gelation occurs over slightly longer periods.

Where shorter gelation periods are desired the acid-to-metal cation equivalent ratio employed initially to leach the metal silicate starting material can be utilized at the lower end of the permissible range. Ratios of from 0.9 to 1.0 reduce the gelation time to less than about 2 hours. Although causing a slight lowering of the specific surface area of the final gel product, normal gelation time can be reduced to a period as short as 1 hour by adding fluoride ions, for example, in the form of $KF \cdot 2H_2O$, in trace concentrations to the silicic acid solution to catalyze the gel formation. Moreover, increasing the pH of the silicic acid solution by the addition of OH ions (for example ammonium hydroxide) will reduce gelation time but also cause a slight reduction in surface area of the final product if the adjusted pH is greater than about 3.

It is a unique property of the silica gel adsorbents produced by the present process that by controlled drying of the wet gel, an agglomerated product is formed having sufficient strength to require no added binder material. Optimum results, i.e. minimum breakup into small particles, are achieved by slow drying, usually in stepwise fashion, at temperatures of from about 20° C. to about 80° C., with the permissible temperature range being from about 20° to about 100° C. Atmospheric pressure is suitably employed. Typically, a gel is allowed to dry at ambient temperature for 24 hours, then at about 80° C. for 4–8 hours, and finally at 100° C. for 4–8 hours. Thereby, the agglomerates achieve a high degree of mechanical strength while retaining the structure having the high surface area values described above. Drying temperatures in excess of about 100° C. also lead to degradation of the adsorbent properties of the silica gel particles. It has been further surprisingly found that unless the silicic acid solution resulting from the acid leaching of the metal silicate starting material is not isolated from the pseudomorphic silica residue prior to gelling and drying, the resulting silica gel does not exhibit self-bonding agglomeration characteristics and requires the addition thereto of inert binder material to form suitable agglomerates.

It is well known that the adsorption characteristics of silica gels vary appreciably even those having essentially the same specific surface area values. In general, the variation can be defined by differentiating between the adsorption capacity at partial pressure $(P/P_o)$ less than 0.5 and adsorption capacity at partial pressures from 0.5 to 1.0, the general shape of the adsorption isotherm, and the capillary adsorption characteristics. Differing adsorption characteristics discernible at low and high values of $P/P_o$ (where $P_o$ is the vapor pressure of the liquid phase and P is the pressure of vapor over the gel at any given equilibrium point) are due, in the main, to the pore size distribution within a silica gel. Depending on this distribution, a given gel sample can contain uniform, very small or micropores, uniform, relatively large macropores of capillaries, or a combination of micropores and macropores. Many commercial silica gel materials with surface areas in the range of 800–850 m.$^2$/gram contain no capillary void volume, and all of their adsorption volume is filled by a $P/P_o$ of 0.5.

It is thus apparent that the method of preparation of a silica gel has a marked influence on its adsorption characteristics, which characteristics are by no means determined solely by the specific surface area of the gel. With respect to the silica gel adsorbents prepared by the process of the present invention, characterization by adsorption-desorption isotherms with nitrogen at its boiling point (−196° C., 760 mm. Hg) shows the presence of two distinct adsorption pore volumes $V_p^1$ and $V_p^2$, which are, respectively, (a) very narrow pores or micropores of less than 20 to 25 A. in radius which exhibit no adsorption hysteresis with nitrogen, and (b) uniform capillary pores with radii of 20 to 50 A. giving hysteresis phenomenon with nitrogen. Although the total pore volume $V_p^t$ is the sum both types of pore volume, only the mocropore volume $V_p^1$ is reflected in the nitrogen surface area measurement which, for the adsorbents of the present invention, give surface areas between about 700 and 900 square meters per gram of adsorbent on an anhydrous basis. Pore volumes are given in cc. of liquid nitrogen (assuming a liquid density of nitrogen at its boiling point, $-196°$ C., of 0.8075 g./cc.) per gram of activated adsorbent. An increase in the volume of capillary pores leads to an increase in adsorption capacity at high partial pressure, while an increase in the volume of micropores, which is proportional to the surface area, leads to higher adsorption capacity at low partial pressures. Specific data concerning nitrogen adsorption and physical characteristics of the gels of the present invention are set forth in Table III infra. It will be seen therefrom that the process of the present invention enables one to vary the total port volume of the gel products as well as the relative proportions of capillary pores and micropores by varying the process conditions such as type of acid, temperature and normality.

The following examples demonstrate the process of this invention, said examples being solely for purposes of illustration and in no sense limitative of proper scope of the process variables as described hereinbefore.

EXAMPLE 1

A volume of 184 ml. of 1 N HCl was placed in a 500-ml. glass reactor equipped with a $H_2O$-cooled reflux condenser and a power-driven glass stirrer. A quantity of 10 g. of wollastonite was added to the acid while being stirred. The slurry was then heated to boiling using a heating mantle and held at boiling for 15 min. The slurry was then filtered by vacuum through No. 42 Whatman filter paper using a Buchner funnel and vacuum flask. The pH of the filtrate after cooling to room temperature was 1.0 as measured with a pH meter. Analysis of a portion of the filtrate showed 1.53 wt.-percent $SiO_2$ and 2.2 wt.-percent CaO. Thus the 184 ml. of filtrate contained 2.83 g. of dissolved silica or 57% of the 5.0 g. $SiO_2$ in the starting wollastonite (by analysis 50.3 wt.-percent $SiO_2$, 46.4 wt.-percent CaO).

The filtrate was placed in a glass container and held at 100° C. in a steam bath for 22 hours. The gel was then separated from the spent filtrate by vacuum filtration using No. 41 Whatman filter paper with a Buchner funnel and vacuum flask. The gel was washed on the filter paper with 500 ml. hot distilled $H_2O$ until Cl⁻ free. The washed gel was placed in a petri dish and dried in air at 100° C. for 4 hours. The equivalent nitrogen surface area measured after vacuum activation at 200° C., for the silica gel product, was 819 m.²/g.

EXAMPLES 2–5

(A) Using wollastonite, the procedure of Example 1 was repeated in a series of four runs to demonstrate the effectiveness of the process using variations in (a) the leaching acid, (b) duration of leaching period, (c) leaching temperature, (d) pH of silicic acid solution leach product, (e) gelation time and (f) gel drying time. The pertinent data are set forth in Table I. In the column headings of the table, $$\frac{H^+}{M^{+2}/2}$$

is the ratio of equivalents of acid-derived hydrogen ions to metal ions of the wollastonite starting material, and "B-E-T $N_2$ Sur. Area, m.²/g." is the equivalent nitrogen surface area of the final activated gel product as deter-

TABLE I

| | Reaction | | | | Filtrate | | | Gel | | | | | Reactants | | |
|---|---|---|---|---|---|---|---|---|---|---|---|---|---|---|---|
| Example No. | $SiO_2$ charged, grams | Acid | Normality | $\frac{H^+}{M^{+2}/2}$ | Leach duration, hr. | Leach temp., °C. | Wt. percent $SiO_2$ | $SiO_2$, extracted, grams | $SiO_2$, extracted, percent | pH | Gelling time, hr. | Gelling temp., °C. | Drying time, hr. | Drying temp., hr. | B-E-T $N_2$ sur. area, M²/g. | Silicate, g. | Acid, ml. | Filtrate, ml. |
| | | | | | | | WOLLASTONITE | | | | | | | | | | | |
| 2 | 5.0 | HCl | 1 | 1 | ½ | R.T. | 1.37 | 2.52 | 50 | 0.9 | 22 | 100 | 6 | 100 | 812 | 10.0 | 184 | 184 |
| 3 | 5.0 | HCl | 1 | 1 | ½ | 101 | 1.53 | 2.83 | 57 | 1.0 | 22 | 100 | 4 | 100 | 819 | 10.0 | 184 | 184 |
| 4 | 5.0 | $H_2SO_4$ | 1 | 1 | ½ | R.T. | 1.7 | 3.2 | 64 | 1.2 | 22 | 100 | 4 | 100 | 862 | 10.0 | 186 | 186 |
| 5 | 5.0 | $H_2SO_4$ | 1 | 1 | ½ | 101 | 1.9 | 2.77 | 71 | 1.5 | 17 | 100 | 6 | 100 | 879 | 10.0 | 186 | 186 |
| | | | | | | CHRYSOTILE ASBESTOS | | | | | | | | | | | | |
| | 11.7 | HCl | 1 | 1.1 | ¼ | 101 | 0.2 | 1.42 | 12 | 1.0 | 100 | 100 | | (No gel) | | 30.0 | 711 | 711 |
| | | | | | | EMSTATITE | | | | | | | | | | | | |
| | 4.7 | HCl | 1 | 1.1 | ½ | 101 | 0.2 | 0.4 | 8 | 0.1 | 21 | 100 | | (No gel) | | 10.0 | 220 | 220 | mined by the Braunauer-Emmett-Teller gas adsorption method for surface area determination [J.A.C.S., 57, 1754 (1935); J.A.C.S., 59, 1553 and 2683 (1937)].

(B) For purposes of comparison two silicate minerals not within the scope of the present invention were employed as starting materials. These were chrysotile asbestos ($MG_3SiO_5(OH)_4$), and enstatite, $MgSiO_3$. The unsuitability of these two minerals is demonstrated by the data also set forth in Table I.

EXAMPLE 6

In order to demonstrate the effect on equivalent nitrogen surface area of a silica gel of variations in (a) pH of the silicic acid solution resulting from the acid leaching step and (b) variations in gel drying temperatures, the filtrate resulting from leaching wollastonite with hydrochloric acid was divided into a number of portions. To 10 portions of this filtrate either $NH_4OH$ or HCl was added to adjust the pH over the range of 0.0 to 8.2. The solutions were thereafter aged, gelled, dried and activated and surface area determinations made. Drying times and drying temperatures were kept constant for all runs. Aging times and/or aging temperatures on those samples having pH values above 2.8 were different from those samples having lower pH values because of the accelerated gelation resulting from these high pH values.

Three additional portions were adjusted to a pH of 0.8, aged for 16 hours at 100° C., and dried for 4 hours at three different temperatures respectively. Pertinent data are set forth in Table II below.

The slurry was filtered by vacuum through No. 42 Whatman filter paper using a Buchner funnel and vacuum flask. The pH of the filtrate after cooling to room temperature was 0.9 as measured with a pH meter. Analysis of a portion of the filtrate showed 1.3 wt.-percent $SiO_2$. Thus the 220 ml. of filtrate contained 2.9 g. of dissolved silica or 72% of the 4.0 g. $SiO_2$ in the starting chrysolite (by analysis 40.1 wt.-percent $SiO_2$).

The filtrate was placed in a glass container and held at 100° C. in a steam bath for 20 hours. The gel was separated from the spent filtrate by vacuum filtration using No. 41 Whatman filter paper with a Buchner funnel and vacuum flask. The gel was washed on the filter paper with 500 ml. hot distilled $H_2O$ until $Cl^-$ free. The washed gel was placed in a petri dish and dried in air at 100° C. for 6 hours. The equivalent nitrogen surface area, measured after vacuum activation at 200° C., of the silica gel product was 797 m.²/g.

EXAMPLE 9

A volume of 101 ml. of 1 N HCl was placed in a 500 ml. glass reactor equipped with a $H_2O$-cooled reflux condenser and a power-driven glass stirrer. A quantity of 8.5 g. of datolite ($HCaBSiO_5$) was added to the acid while being stirred. The slurry was then heated to boiling using a heating mantle and held at boiling for 15 min. The slurry was then filtered by vacuum through No. 42 Whatman filter paper using a Buchner funnel and vacuum flask. The pH of the filtrate after cooling the room temperature was 1.3 as measured with a pH meter.

TABLE II

| Wollastonite Charged (as $SiO_2$), g. | Reaction | | | | | Filtrate | | | Gel Product | | | | | |
|---|---|---|---|---|---|---|---|---|---|---|---|---|---|---|
| | Acid | Normality | H+ $M+^2/2$ | Leach duration, hr. | Leach temp., °C. | Wt. percent $SiO_2$ | g. $SiO_2$ | Percent $SiO_2$ extracted | pH | Aging time, hr. | Aging temp., °C. | Drying time, hr. | Drying temp., °C. | B-E-T $N_2$ S.A.M²/g. |
| 30.0 | HCl | 1 N | 1.1 | 6 | 101 | 1.51 | 15.4 | 51 | | | | | | |
| Filtrate split into portions to vary pH. Original filtrate pH=0.8. pH varied by addition of HCl or $NH_4OH$. | | | | | | | | | 0.0 | 16 | 100 | 4 | 100 | 800 |
| | | | | | | | | | 0.5 | 16 | 100 | 4 | 100 | 801 |
| | | | | | | | | | 1.0 | 16 | 100 | 4 | 100 | 826 |
| | | | | | | | | | 1.5 | 16 | 100 | 4 | 100 | 818 |
| | | | | | | | | | 2.0 | 16 | 100 | 4 | 100 | 797 |
| | | | | | | | | | 2.8 | 2 | 100 | 4 | 100 | 836 |
| | | | | | | | | | 3.2 | 2 | 100 | 4 | 100 | 826 |
| | | | | | | | | | 4.2 | ½ | R.T. | 4 | 100 | 691 |
| | | | | | | | | | 6.6 | ½ | R.T. | 4 | 100 | 591 |
| | | | | | | | | | 8.2 | ½ | R.T. | 4 | 100 | 406 |
| Filtrate split into portions to vary drying temperature. | | | | | | | | | 0.8 | 16 | 100 | 4 | 125 | 793 |
| | | | | | | | | | 0.8 | 16 | 100 | 4 | 100 | 794 |
| | | | | | | | | | 0.8 | 16 | 100 | 4 | 75 | 786 |

It is to be noted that the surface area of the gel drops sharply at pH values above about 4.

EXAMPLE 7

Fifty-eight (58) grams of wollastonite was extracted for 1 hour at 100° C. with dilute HCl prepared by diluting 88.5 ml. of 36% HCl to make 1 liter of solution. The calcium and approximately 60 percent of the silica was extracted from the wollastonite. The remaining solid silica pseudomorph was removed by filtration. The filtrate was digested for about 4 hours during which period a gel formed. The gel was thereafter isolated by filtration, washed chloride-free with distilled water and then dried. Drying was carried out in three stages, namely (a) at ambient room temperature for 24 hours, (b) at 80° C. for 8 hours, and (c) at 100° C. for 8 hours. The product had a surface area of 750–800 square meters/gram and a bulk crush strength of 29%. Crush strength represents the percent of −4+8 mesh gel particles retained on +8 mesh screen after crushing at 2000 p.s.i.

EXAMPLE 8

A volume of 220 ml. of 1 N HCl was placed in a 500 ml. glass reactor equipped with a $H_2O$-cooled reflux condenser and a power-driven glass stirrer. A quantity of 10 g. of chrysolite [$(Mg, Fe)_2SiO_4$] was added to the acid while being stirred. The slurry was then heated to boiling using a heating mantle and held at boiling for 30 min.

The filtrate was placed in a glass container and held at 100° C. in a steam bath for 20 hours. The gel was separated from the spent filtrate by vacuum filtration using No. 41 Whatman filter paper with a Buchner funnel and vacuum flask. The gel was washed on the filter paper with 500 ml. hot distilled $H_2O$ until $Cl^-$ free. The washed gel was placed in a petri dish and dried in air at 100° C. for 6 hours. The equivalent nitrogen surface area, measured after vacuum activation at 200° C., of the silica gel product was 683 m.²/g.

EXAMPLE 10

Pectolite [$HNaCa_2(SiO_3)_3$] was treated by a procedure similar to that of the preceding examples. A quantity of 8.4 g. of pectolite was added to 123 ml. of 1 N HCl and held at boiling for 15 minutes. The filtrate pH was 1.2.

The filtrate was held at 100° C. for 20 hours. The filtered and washed gel was dried in air at 100° C. for 6 hours. The nitrogen surface area of the gel product, after activation at 200° C., was 750 m.²/g.

EXAMPLE 11

Lithium metasilicate ($Li_2SiO_3$) was treated by a procedure similar to that of the preceding examples. A quantity of 100 g. of $Li_2SiO_3$ was added to 242 ml. of 1 N HCl and held at boiling for 15 minutes. The filtrate pH was 1.1.

The filtrate was held at 100° C. for 20 hours. The filtered and washed gel was dried in air at 100° C. for 6 hours. The nitrogen surface area of the gel product, after activation at 200° C., was 697 m.²/g.

EXAMPLE 12

Using the procedure of the preceding examples, a 10-gram sample of blast furnace slag (an amorphous calcium metasilicate containing 37.8 wt.-percent $SiO_2$ and 39.7 wt.-percent CaO) was treated with 250 ml. of 1 N hydrochloric acid for 1 hour at 101° C. The acid-to-metal ion equivalent was 1.1. The resultant filtrate, which had a pH of 0.9, contained 1.2 wt.-percent $SiO_2$. This filtrate was heated at 100° C. for 21 hours. The filtered and washed gel was dried in air at 100° C. for 4 hours. Nitrogen surface area of the agglomerate product was 793 m.²/g.

The silica gel adsorbents of this invention are distinguished from those of the prior art by having an equivalent nitrogen surface area of at least about 700 square meters per gram (B–E–T method referenced hereinabove), a total pore volume $V_p^t$ of at least 50 cc./100 grams, the major proportion, at least about 60% and preferably at least about 70% of which is contributed by a micropore volume which adsorbs nitrogen at $P/P_0$ values of less than about 0.5, and the minor proportion, at least about 10% and preferably at least about 15% of which is contributed by a capillary pore volume which adsorbs nitrogen at $P/P_0$ values greater than about 0.5. These distinguishing characteristics were determined for six wollastonite-derived silica gels prepared in accordance with the process of this invention are set forth in Table III below.

The adsorbents of the invention may be activated in air or in vacuum at temperatures in the range 150–200° C. Those adsorbents exhibiting high capillary pore volume, as evidenced by nitrogen adsorption, show maximum adsorption capacity for water at partial pressures approaching 1. These are accordingly the most useful in bulk desiccant applications. The advantage of the adsorbent of the invention having a capillary void volume is reflected in its improved water adsorption capacity at high partial pressures compared to the capacity of the commercial gel material in the same pressure region.

In addition to water and nitrogen, other polar and nonpolar type adsorbates may be adsorbed by the adsorbents of the invention.

What is claimed is:
1. Process for preparing a silica gel agglomerate which comprises contacting at a temperature within the range of from about 20° C. to about 105° C., a metal silicate having the empirical formula:

$$M_{2/n}O \cdot c[SiO_2] \cdot xH_2O$$

wherein M is selected from the class consisting of Ca, Li, Mg, (Mg, Fe), (Ca, Na, H) and (Ca, B, H), $n$ represents the equivalents of M, $x$ is an integer having a value of from 0 to 1 inclusive, and $c$ has a value of 0.5 to 1 when M is a member selected from Ca and Li; $c$ has a value of 0.5 when M is a member selected from Mg and (Mg, Fe); $c$ has a value of 1 when M is (Ca, Na, H); and $c$ has a value of 0.3 when M is (Ca, B, H); with an aqueous solution of an acid having a $pK_a$ value of less than about 3, a concentration of from about 0.5 N to about 4 N, the acid-to-metal ion equivalent being within the range of from about 0.9 to 2.75, for a period of time to form an aqueous silicic acid solution containing from about 1 to about 3 weight percent $SiO_2$, separating the silicic acid solution from any remaining insoluble material, gelling the silicic acid solution by adjusting the pH thereof to within the range of from about 0.5 to about 4, and dehydrating the gel thus formed at temperatures from about 20° C. to about 100° C.

2. Process according to claim 1 wherein the metal silicate is contacted with an aqueous solution of a mineral acid of the class consisting of hydrochloric, nitric, and sulfuric.

3. The process according to claim 1 wherein the concentration of the aqueous acid solution employed to contact the metal silicate is from about 0.75 N to about 2 N.

4. The process according to claim 3 wherein the silicic acid solution is gelled at a pH value of from about 1.0 to about 2.5.

5. Process according to claim 3 wherein the metal silicate is a calcium metasilicate having the formula $CaSiO_3$.

6. Process according to claim 5 in which the calcium metasilicate is wollastonite.

7. Process according to claim 5 in which the calcium metasilicate is blast furnace slag.

8. A silica gel adsorbent having an equivalent nitrogen surface area of at least about 700 square meters per gram as determined by the Braunauer-Emmett-Teller gas adsorption method, a total pore volume of at least 50 cc./

TABLE III

| | History[x] | Nitrogen surface area, M²/g. | $\bar{r}$, A.* | $V_p^{T*}$ Total | Micropores $V_p^{1*}$, with* $r_K <$ A. | | Capillary Pores $V_p^{2*}$, with* $r_K >$ A. | | Range of $r_K$ in capillary pores, A. |
|---|---|---|---|---|---|---|---|---|---|
| Gel product: | | | | | | | | | |
| A | a | 807 | 15.1 | 60.6 | 43.0 | 18.5 | 17.6 | 18.5 | 18.5→ 50 |
| B | b | 818 | 14.0 | 57.0 | 42.7 | 19.9 | 14.3 | 19.9 | 19.9→ 52 |
| C | c | 836 | 12.2 | 50.1 | 43.2 | 20.4 | 6.9 | 20.4 | 20.4→ 47 |
| D | d | 880 | 11.8 | 51.7 | 44.4 | 20.5 | 7.3 | 20.5 | 20.5→ 56 |
| E | e | 843 | 13.1 | 50.3 | 44.4 | 21.0 | 5.9 | 21.0 | 21.0→ 60 |
| F | f | 811 | 15.7 | 63.9 | 40.7 | 18.5 | 23.2 | 18.5 | 18.5→ ~400 |

[x] a=Wollastonite treated with 1 N HCl, 100° C., at pH=1.0; 1.2, Gelling Time, hr.=22 Gelling Temp., ° C.=100 Drying Time, hr.=4 Drying Temp., ° C.=100.
b=Wollastonite treated with 1 N HCl, 100° C., at pH=1.5; 1.2, Gelling Time, hr.=16 Gelling Temp., ° C.,=100 Drying Time, hr.=4 Drying Temp., ° C.=100.
c=Wollastonite treated with 1 N HCl, 100° C., at pH=2.8; 1.2, Gelling Time, hr.=2 Gelling Temp., ° C.=100 Drying Time, hr.=4 Drying Temp., ° C.=100.
d=Wollastonite treated with 1 N $H_2SO_4$, 100° C., at pH=1.8; 1.2, Gelling Time, hr.=22 Gelling Temp., ° C.=100 Drying Time, hr.=4 Drying Temp., ° C.=100.
e=Wollastonite treated with 2 N $H_2SO_4$, 100° C., at pH=1.2; 1.2, Gelling Time, hr.=5 Gelling Temp., ° C.=100 Drying Time, hr.=6 Drying Temp., ° C.=100.
f=Wollastonite treated with 3 N $H_2SO_4$, 100° C., at pH=0.85; 1.2, Gelling Time, hr.=5 Gelling Temp., ° C.=100 Drying Time, hr.=16 Drying Temp., ° C.=100.
*$V_p^T$=total pore volume in cc. liquid nitrogen/100 grams (adsorption capacity at $P/P_0$=~0.95).
$V_p^1$=micropore volume in cc. liquid nitrogen/100 grams (adsorption capacity at $P/P_0$=~0.5).
$V_p^2$=capillary pore volume in cc. liquid nitrogen/100 grams (adsorption capacity at $P/P_0$=~1.0).
$\bar{r}$=average pore radius calculated from equation $\bar{r}=2V_p^T$ where S.A.=equivalent nitrogen surface area.
    S.A.
$r_K$=equivalent Kelvin radius of capillary pores corrected for thickness of adsorbed nitrogen layer (ref. "Fine Particle Measurement" by Orr and Dallavalle, MacMillan, 1959, pp. 270, 272).

100 grams, at least 60 percent of said total pore volume being contributed by a micropore volume which adsorbs nitrogen at $P/P_o$ values of less than about 0.5 and at least 10 percent of said total pore volume being contributed by capillary pore volume which adsorbs nitrogen at $P/P_o$ values greater than about 0.5.

9. The silica gel adsorbent of claim 8 wherein the equivalent nitrogen surface area is at least 800 square meters per gram, at least 70 percent of the total pore volume is contributed by micropore volume which adsorbs nitrogen at $P/P_o$ values of less than about 0.5, and at least 15 percent of the total pore volume is contributed by a capillary pore volume which adsorbs nitrogen at $P/P_o$ values greater than about 0.5.

References Cited

UNITED STATES PATENTS

| | | | |
|---|---|---|---|
| 2,288,873 | 7/1942 | d'Duville | 252—450 X |
| 2,475,253 | 7/1949 | Pierce | 23—182 |
| 2,686,731 | 8/1954 | Wainer | 106—306 |
| 2,699,376 | 1/1955 | Hay | 23—182 |
| 2,824,075 | 2/1958 | Thompson et al. | 252—450 X |
| 3,110,564 | 11/1963 | Rodis et al. | 23—182 |

DANIEL E. WYMAN, Primary Examiner

C. F. DEES, Assistant Examiner

U.S. Cl. X.R.

23—182; 252—451